(12) United States Patent
Manuel et al.

(10) Patent No.: US 11,582,134 B2
(45) Date of Patent: Feb. 14, 2023

(54) METHOD AND SYSTEM FOR REMOTE TESTING OF DEVICES

(71) Applicant: L&T TECHNOLOGY SERVICES LIMITED, Chennai (IN)

(72) Inventors: Sumanth Roshan Raj Manuel, Bangalore (IN); Nikita Swain, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 17/554,017

(22) Filed: Dec. 17, 2021

(65) Prior Publication Data

US 2022/0417129 A1    Dec. 29, 2022

(51) Int. Cl.
*G06F 15/173* (2006.01)
*H04L 43/50* (2022.01)
*H04L 12/46* (2006.01)
*H04L 43/00* (2022.01)

(52) U.S. Cl.
CPC .......... *H04L 43/50* (2013.01); *H04L 12/4633* (2013.01); *H04L 43/14* (2013.01)

(58) Field of Classification Search
None
See application file for complete search history.

(56) References Cited

U.S. PATENT DOCUMENTS

| | | | | |
|---|---|---|---|---|
| 11,219,034 B1* | 1/2022 | Dunsmore | .......... | H04W 72/048 |
| 2010/0099396 A1* | 4/2010 | Huq | .......... | H04L 67/04 |
| | | | | 455/420 |
| 2012/0191770 A1* | 7/2012 | Perlmutter | .......... | H04W 4/50 |
| | | | | 709/201 |
| 2012/0271953 A1* | 10/2012 | Gulley | .......... | H04L 67/10 |
| | | | | 709/226 |
| 2013/0031618 A1* | 1/2013 | Momchilov | .......... | G06F 3/14 |
| | | | | 726/7 |
| 2016/0050224 A1* | 2/2016 | Ricafort | .......... | H04L 63/1416 |
| | | | | 726/23 |
| 2017/0118199 A1* | 4/2017 | Albisu | .......... | H04L 12/2858 |
| 2018/0159902 A1* | 6/2018 | Murphy | .......... | H04L 63/029 |
| 2018/0262388 A1* | 9/2018 | Johnson | .......... | H04L 63/0823 |
| 2019/0116242 A1* | 4/2019 | Shribman | .......... | H04L 67/60 |
| 2020/0076721 A1* | 3/2020 | Amadie | .......... | H04L 12/66 |
| 2021/0266354 A1* | 8/2021 | Shribman | .......... | H04N 21/6125 |

FOREIGN PATENT DOCUMENTS

| | | | | | |
|---|---|---|---|---|---|
| EP | 3770773 A1 * | 1/2021 | .......... | G06F 16/955 |
| WO | WO-2017106208 A2 * | 6/2017 | ......... | H04L 12/4633 |

* cited by examiner

*Primary Examiner* — Phyllis A Book
(74) *Attorney, Agent, or Firm* — Kendal Sheets

(57) ABSTRACT

A method and system for remote testing of a plurality of devices is disclosed. The method may include receiving a request from a client system to perform testing on a set of remote devices. The local system and the client system are connected via a first network connection and the plurality of remote devices are connected to the local system via a second network connection. The method may further include receiving an input from the client system with reference to a test-suite to perform a testing action on the set of remote devices, generating a test command corresponding to the input, and transmitting the test command to each of the set of remote devices. The method may further include receiving feedback from each of the set of remote devices and transmitting the feedback to the client system.

17 Claims, 5 Drawing Sheets

METHOD AND SYSTEM FOR REMOTE TESTING OF DEVICES

TECHNICAL FIELD

This disclosure relates generally to device testing, and more particularly to method and system for remote testing of a plurality of devices, for example, Android devices.

BACKGROUND

Test automation frameworks are available that integrate various test components based on unique device and platform configurations, and provide results powered by internal validation algorithms. For example, devices under test may include mobile phones, personal computers (i.e. laptops, desktops, etc.), smartwatches, etc. Further, by way of an example, the devices may be Android-based or iOS-based. However, in scenarios when direct access to the devices is not available, these available test automation frameworks tend to lose their utility.

Some remote testing solutions are available that are based on remote desktop techniques and provide for remotely running automation test cases on remote devices. However, the remote testing techniques are slow and inefficient. For example, remote testing using these remote desktop-based techniques may take twice or thrice the time as compared to performing testing otherwise.

There is, therefore, a need for efficient and effective remote testing solutions for testing a plurality of devices simultaneously.

SUMMARY OF THE INVENTION

In one embodiment, a method of testing a plurality of remote devices is disclosed. The method may include receiving a request from a client system to perform testing on a set of remote devices of a plurality of remote devices. The local system and the client system may be connected via a first network connection. The local system may be configured to obtain and store an identity of each of the plurality of remote devices. The plurality of remote devices may be connected to the local system via a second network connection. The method may further include receiving an input from the client system with reference to a test-suite to perform a testing action on the set of remote devices. The test-suite may be uploaded from the client system to the local system. The method may further include generating a test command corresponding to the input to perform the testing action on the set of remote devices and transmitting the test command to each of the set of remote devices. Each of the set of remote devices is to perform the testing action based on the test command. The method may further include receiving a feedback from each of the set of remote devices and transmitting the feedback to the client system.

In another embodiment, a system for testing a plurality of remote devices is disclosed. The system may include a processor and a memory coupled to the processor. The memory is configured to store a plurality of processor-executable instructions which, upon execution by the processor, may cause the processor to receive a request from a client system to perform testing on a set of remote device of a plurality of remote devices. The system and the client system may be connected via a first network connection. The system may be configured to obtain and store an identity of each of the plurality of remote devices. The plurality of remote devices may be connected to the system via a second network connection. The plurality of processor-executable instructions may further cause the processor to receive an input from the client system with reference to a test-suite to perform a testing action on the set of remote devices. The test-suite may be uploaded from the client system to the system. The plurality of processor-executable instructions may further cause the processor to generate a test command corresponding to the input to perform the testing action on the set of remote devices and transmit the test command to each of the set of remote devices. Each of the set of remote devices is to perform the testing action based on the test command. The plurality of processor-executable instructions may further cause the processor to receive a feedback from each of the set of remote devices and transmitting the feedback to the client system.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A-5B illustrate snapshots of test reports generated upon testing of the remote devices, in accordance with some embodiments of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed.

One or more techniques for testing a plurality of remote devices are disclosed. The techniques provide for running automation test cases (i.e. test suites) on remote devices (for example, Android devices) despite the devices being on different networks. The automation test cases may be run from a client system which may be connected to a local system over an Internet connection, via tunneling. The local system may further be connected to the remote devices which are to be tested via a separate network like a USB network or wireless network. Users (i.e. using the client system) can choose any number of remote devices from the list of remote devices connected to the local system for testing. The techniques enable the users to run a test-suite from a browser installed on the client system and view live streaming of the display screens of the remote devices on the client system, while the test execution is in process. The techniques, therefore, provide access to witness the entire test execution in real-time. As such, the techniques provide freedom to create an independent Android device cloud and making it accessible for testing. Further, the techniques provide for generation of test reports based on the test execution that are then made available for downloading at the client system. Moreover, the test reports can also be made publicly available by assigning an IP address and a URL to the test reports, thereby making the test reports shareable and viewable by multiple users who may be distributed across different locations.

Figure 1:
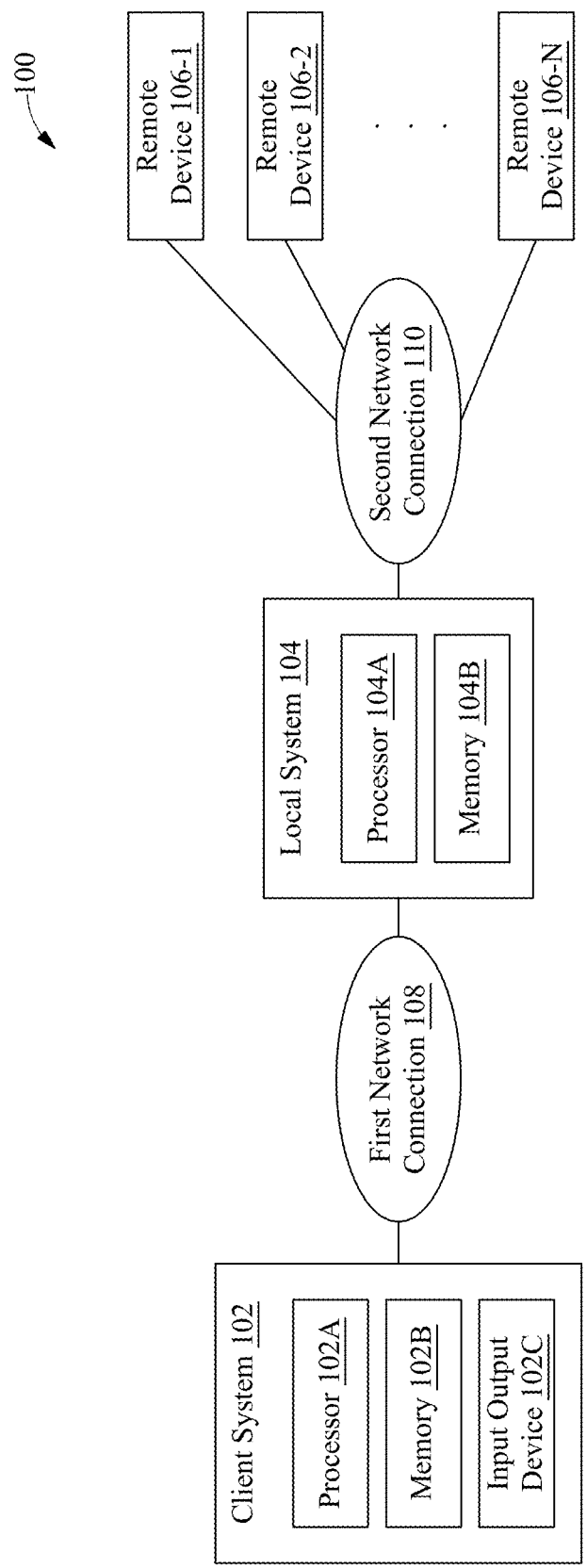
FIG. 1 illustrates a block diagram of an environment for testing of a plurality of remote devices, in accordance with some embodiments of the present disclosure.

Referring now to FIG. 1, a block diagram of an environment 100 for testing of a plurality of remote devices is illustrated, in accordance with an embodiment of the present disclosure. As shown in FIG. 1, the environment 100 may include a client system 102, a local system 104, and a plurality of remote devices 106A, 106B, . . . 106N (hereinafter, collectively, referred to as plurality of remote devices 106).

The client system 102 may be a computing device, like a desktop, a laptop, a smartphone, a server, etc. The client system 102 may be configured to connect with the local system 104 over a first network connection 108. The first network connection 108 may be an Internet-based connection. Further, the plurality of remote devices 106 may be connected to the local system 104 over a second network connection 110. In some embodiments, the second network connection 110 may be a Universal Serial Bus (USB) network connection. As such, the local machine 104 may include a plurality of USB ports into which the plurality of remote devices 106 may be plugged in using USB compatible data cables. Alternately, the second network connection 110 may be a wireless network connection. For example, the wireless network may be a Wi-Fi-based network. To this end, the local machine 104 and the each of the plurality of remote devices 106 may have Wi-Fi capability.

The client system 102 may be configured to perform one or more functionalities, which may include sending a request to the local system 104 to perform testing on the set of remote device of a plurality of remote devices 106. To this end, the one or more functionalities may further include providing to the local device 104 a selection of identities of the set of remote devices from the plurality of remote devices 106 for performing testing on the set of remote devices. The one or more functionalities may further include receiving an input from a user and forwarding the input to local device 104. The input may be in reference to a test-suite to perform a testing action on the set of remote devices. As such, the one or more functionalities performed by the client system 102 may further include uploading the test-suite to the local system 104. In some embodiments, the one or more functionalities performed by the client system 102 may further include generating a test report corresponding to the remote testing of the set of devices. Further, the one or more functionalities may include displaying the test report via an input/output device. The test report may be downloaded at the client system 102.

In order to perform the above-discussed functionalities, the client system 102 may include a processor 102A, a memory 102B, and an input/output device 102C. The processor 102A may include suitable logic, circuitry, interfaces, and/or code that may be configured to perform testing of the plurality of remote devices 106. The processor 102A may be implemented based on temporal and spatial processor technologies, which may be known to one ordinarily skilled in the art. Examples of implementations of the processor 102A may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 102B may include suitable logic, circuitry, and/or interfaces that may be configured to store instructions executable by the processor 102A. The memory 102B may store instructions that, when executed by the processor 102A, may cause the processor 102A to perform remote testing of the plurality of devices 106. The memory 102B may be a non-volatile memory or a volatile memory. Examples of non-volatile memory may include, but are not limited to a flash memory, a Read-Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM). The memory 102B may also store various data that may be captured, processed, and/or required by the system.

The client system 102 may further include the input/output device 102C. In some embodiments, the input/output device 102C may further include a display and a user interface. By way of an example, the user interface may include a touchscreen, a keyboard, etc. to receive user inputs. For example, the user input may include selection of identities of one or remote devices (i.e. the set of remote devices) from the plurality of remote devices 106. Further, the display may include a display screen which is capable of displaying the identities of the plurality of remote devices 106, and further display the test report representing the test results of the set of remote devices.

The local system 104 may be a computing device, like a desktop, a laptop, a smartphone, a server, etc. The local system 104 may be configured to perform one or more functionalities, which may include receiving a request from the client system 102 to perform testing on a set of remote devices of a plurality of remote devices 106. As mentioned above, the local system 104 and client system 102 may be connected via the first network connection 108. The local system 104 may be configured to obtain and store an identity of each of the plurality of remote devices 106. The plurality of remote devices 106 may be connected to the local system 104 via the second network connection 110. The one or more functionalities may further include receiving an input from the client system 102 with reference to a test-suite to perform a testing action on the set of remote devices. The test-suite may be uploaded from the client system 102 to the local system 104. The one or more functionalities may further include generating a test command corresponding to the input to perform the testing action on the set of remote devices and transmitting the test command to each of the set of remote devices. Each of the set of remote devices may perform the testing action based on the test command. The one or more functionalities may further include receiving a feedback from each of the set of remote devices and transmitting the feedback to the client system 102.

In order to perform the above-discussed functionalities, the local system 104 may include a processor 104A and a memory 104B. The processor 104A may include suitable logic, circuitry, interfaces, and/or code that may be configured to perform testing of the plurality of remote devices 106. The processor 104A may be implemented based on temporal and spatial processor technologies, which may be known to one ordinarily skilled in the art. Examples of implementations of the processor 104A may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 104B may include suitable logic, circuitry, and/or interfaces that may be configured to store instructions executable by the processor 104A. The memory 104B may store instructions that, when executed by the processor 104A, may cause the processor 104A to perform testing of the plurality of remote devices 106. The memory 104B may be a non-volatile memory or a volatile memory. Examples of non-volatile memory may include, but are not limited to a flash memory, a Read-Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM). The memory 104B may also store various data that may be captured, processed, and/or required by the system.

The first communication network 108 may include a communication medium through which the local system 104 and the client system 102 may communicate with each other. Examples of the first communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the first communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, and cellular communication protocols.

Figure 2:
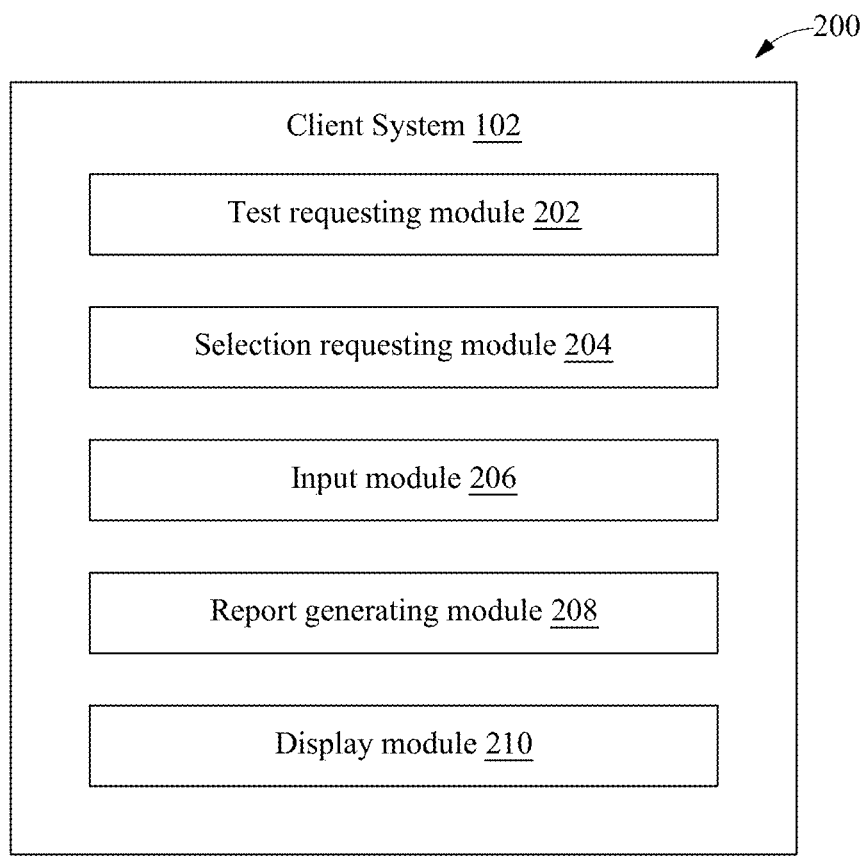
FIG. 2 illustrates a functional block diagram of a client system, in accordance with some embodiments of the present disclosure.

Referring now to FIG. 2, a functional block diagram 200 of the client system 102 is illustrated, in accordance with some embodiments of the present disclosure. The client system 102 may include one or more modules configured to perform one or more functionalities as discussed above. By way of an example, the one or more modules may include a test requesting module 202, a selection requesting module 204, an input module 206, a test report generating module, and a display module 210. It should be noted that the functionalities of the above modules may be performed individually by each module, or alternately the functionalities of multiple modules may be combined in a single module.

The test requesting module 202 may receive a request from a user to perform testing of the set of remote devices. To this end, the client system 102 may include the input/output device 102C which may provide an interface for allowing a user to make such a request.

The selection requesting module 204 may be configured to receive a selection of one or more remote devices to create the set of remote devices which are to be tested. The user may provide the selection of identities of the set of remote devices which are to be tested. The selection requesting module 204 may, therefore, in coordination with the user interface of the input/output device 102C, may allow the user to provide selection of the set of remote devices from the plurality of remote devices 106.

The input module 206 may receive an input from the user to perform the testing action on the set of remote devices. It should be noted, in some embodiments, the input may be received with reference to a test-suite to perform a testing action on the set of remote devices. The test-suite may be uploaded from the client system 102 to the local system 104.

The test report generating module 208 may generate a test report corresponding to the remote testing of the set of devices upon completion of the remote testing. In some embodiments, the display module 210 may function in coordination with the input/output device 102C to display the test report generated by the test report generating module 208. For example, the test report may be displayed using the display screen of the input/output device 102C. Further, the test report generating module 208 may provide for downloading the test report at the client system 102. Alternately, in some embodiments, the test report may be assigned a public IP address so that the test report can be accessed from any remote location.

Figure 3:
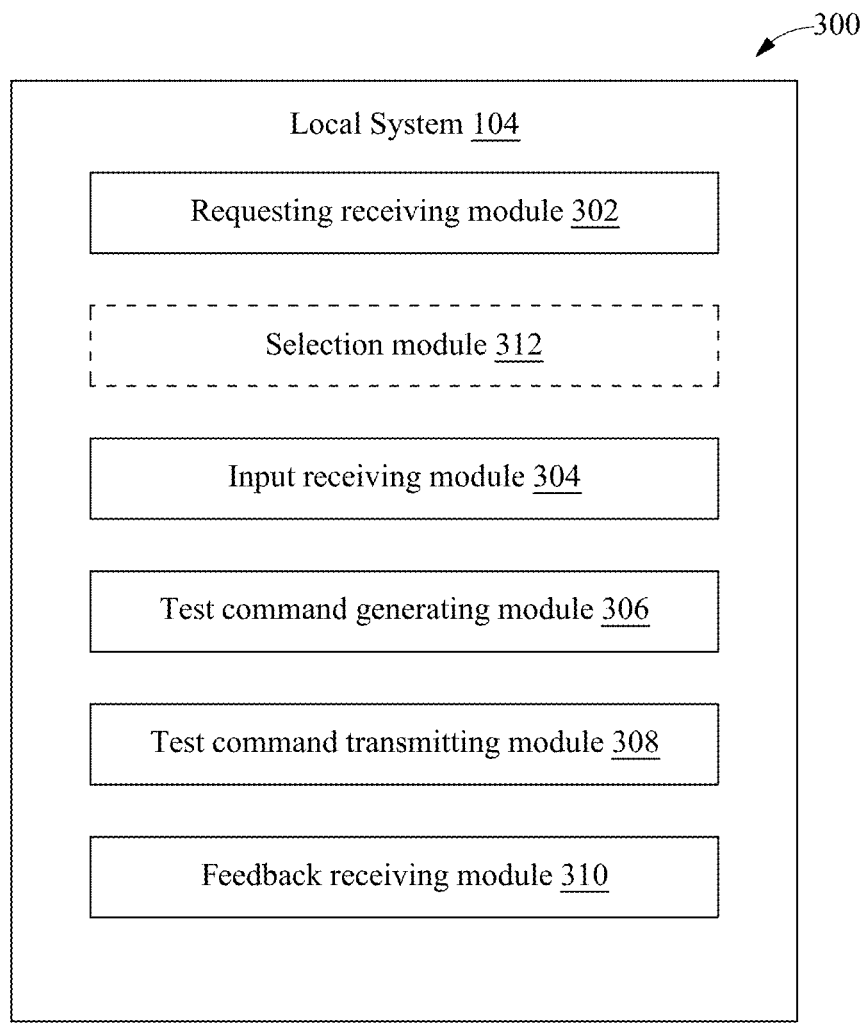
FIG. 3 illustrates a functional block diagram of a local system, in accordance with some embodiments of the present disclosure.

Referring now to FIG. 3, a functional block diagram 300 of the local system 104 is illustrated, in accordance with some embodiments of the present disclosure. The local system 104 may include one or more modules configured to perform one or more functionalities as discussed above. By way of an example, the one or more modules may include a request receiving module 302, an input receiving module 304, a test command generating module 306, a test command transmitting module 308, and a feedback receiving module 310. In some embodiments, the local system 104 may further include a selection module 312. It should be noted that the functionalities of the above modules may be performed individually by each module, or alternately the functionalities of multiple modules may be combined in a single module.

The request receiving module 302 may be configured to receive a request from the client system 102 to perform testing of the set of remote device of the plurality of remote devices 106. The local system 104 and client system 102 may be connected via the first network connection 108. The local system 104 may be configured to obtain and store an identity of each of the plurality of remote devices 106, once the remote devices 106 are connected to the local system 104. For example, the plurality of remote devices 106 may include Android-based devices.

In some embodiments, the selection module 312 may be configured to receive, from the client system 102, a selection of identities of the set of remote devices from the plurality of remote devices 106 for performing testing on the set of remote devices. For example, the local system 104 may be connected to N number of remote devices; however, a user may want to perform testing on M number of devices (where, M<N). As such, the selection module 312 may be configured to receive selection of identities of the M number of remote devices (from the N number of remote devices 106) from the user on which the testing may be performed.

As already mentioned above, the plurality of remote devices 106 may be connected to the local system 104 via the second network connection 110. In some embodiments, the second network connection 110 may be one of a Universal Serial Bus (USB) connection and a wireless network connection. For example, the wireless network may be a Wi-Fi-based network.

In some embodiments, the input receiving module 304 may receive an input from the client system 102 with reference to a test-suite to perform a testing action on the set of remote devices. The test-suite may provide various predefined test routines and test commands that can be used to run the test script on the remote devices. The test-suite may be uploaded from the client system 102 to the local system 104.

The test command generating module 306 may generate a test command corresponding to the input to perform the testing action on the set of remote devices. For example, the test command generating module 306 may convert the input into a test command executable by the remote devices. Alternately, the input may indicate a selection of a test command from the test suite, and the test command generating module 306 may fetch the said test command from the test suite based on the input.

The test command transmitting module 308 may transmit the test command to each of the set of remote devices. As mentioned above, the plurality of remote devices 106 are connected to the local system 104 via the second network connection 110 which may be a Universal Serial Bus (USB) connection or a wireless network connection, e.g. a Wi-Fi-based network. The test command transmitting module 308, therefore, may transmit the test command to each of the set of remote devices over the second network connection 110, and after converting the test command into a format compatible with the communication protocol applicable to the second network connection 110.

The feedback receiving module 310 may receive feedback from each of the set of remote devices. The feedback receiving module 310 may further transmit the feedback to the client system 102. In some embodiments, the feedback may include streaming of content displayed on a display screen of each of the set of remote devices. As such, transmitting the feedback to the client system 102 may include the causing to stream on the client system, in real-time, content displayed on a display screen of each of the set of remote devices. Upon completion of the remote testing, one or more test reports may be generated at the client system 102. Further, the test reports corresponding to the remote testing may be published on a web page.

Figure 4:
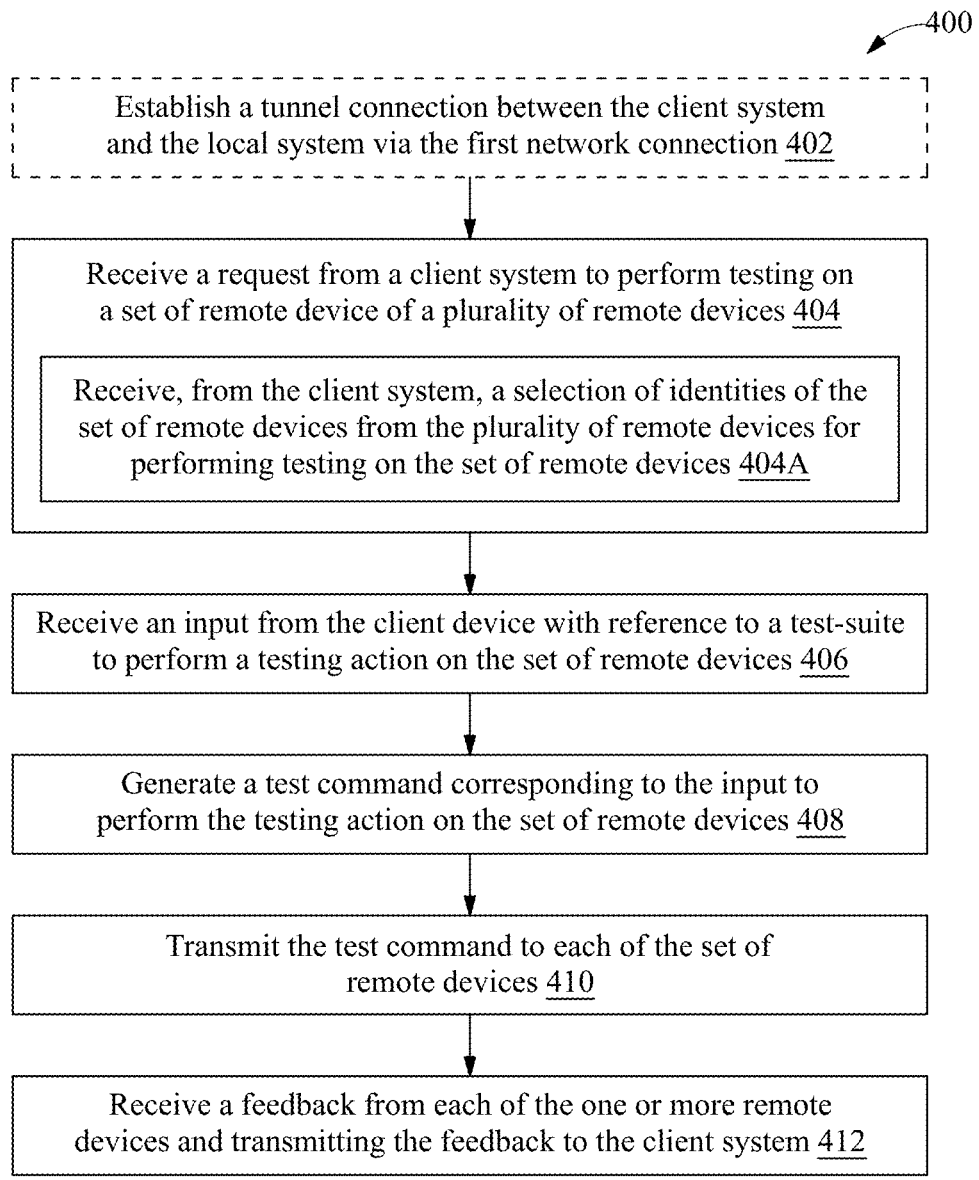
FIG. 4 illustrates a flowchart of a method of testing a plurality of remote devices, in accordance with some embodiments of the present disclosure.

Referring now to FIG. 4, a flowchart of a method 400 of testing the plurality of remote devices 106 is disclosed, in accordance with some embodiments of the present disclosure. In some embodiments, the method 400 may be performed by the local system 104.

In some embodiments, at step 402, a tunnel connection may be established between the client system 102 and the local system 104 over the first network connection 108. In some embodiments, the first network connection 108 may be an Internet-based connection. The client system 102 may, therefore, be able to communicate with the local system 104 via the tunnel connection. In some embodiments, the tunnel connection may be setup using a tunneling tool, for example, "ngrok", "Localtunnel", "Served", "Teleconsole", "Pagekite", and the like.

In some embodiments, in order to establish the tunnel connection, a Uniform Resource Locator (URL) corresponding to the local system 104 may be generated. Further, the generated URL may be shared with the client system 102. The local system 104 may have a localhost server running on it, such that, when instructed, the local system 104 may starts the localhost server that may be made available on a public network using tunnelling. In other words, the local system 104 may be configured to act as a local web server that, for example, may be setup through a Django Python Framework. As such, the client system 102 may be able to access the local system 104 via a browser installed on the client system using the URL. A user may initiate the connection between the client system 102 and the local system 104 by logging in to the public IP address of the local system 104.

At step 404, a request may be received from the client system 102 to perform testing on a set of remote devices of the plurality of remote devices 106. The local system 104 and client system 102, as mentioned earlier, may be connected via the first network connection 108. The plurality of remote devices 106 may be connected to the local system 104 via the second network connection 110. The second network connection 110 may be a Universal Serial Bus (USB) connection. In other words, each of the plurality of remote devices 106 may be connected to the local system 104 via USB ports and a USB cable. In alternate embodiments, the second network connection 110 may be a wireless network connection, for example, a Wi-Fi connection. In such embodiments, it should be noted that all of the plurality of remote devices 106 may be connected to the local system 104 over a common Wi-Fi network.

It should be further noted that the local system 104 may be configured to obtain and store an identity of each of the plurality of remote devices 106. For example, when the plurality of remote devices 106 are Android devices, the identity of each remote device may be an associated Android device ID.

The user using the client system 102 may have the liberty to choose the remote devices that they wish to test and further upload the test cases for automating the test execution. The local system 104, in turn forwards the commands to the selected android phone for further processing, as it will be apparent from the subsequent steps of the method 400.

In order to receive the request from the client system 102 to perform testing on a set of remote device of a plurality of remote devices 106, the step 404 may further include a step 404A. At step 404A, a selection of identities of the set of remote devices may be received. As explained above, the local system 104 may be connected to N number of remote devices; however, a user may want to perform testing on M number of devices (where, M<N). Therefore, at step 404A, a selection of identities of the M number of remote devices (from the N number of remote devices 106) on which the testing may be performed may be received.

At step 406, an input may be received from the client system 102 with reference to the test-suite to perform a testing action on the set of remote devices. The test-suite may provide various predefined test routines and test commands that can be used to run the test script on the remote devices 106. The test-suite may be uploaded from the client system 102 to the local system 104.

At step 408, a test command may be generated corresponding to the input to perform the testing action on the set of remote devices. For example, the input may be converted into a test command executable by the remote devices 106. Alternately, the input may indicate a selection of a test command from the test suite, and therefore, at step 408, the said test command may be fetched from the test suite based on the input.

Further, at step 410, the test command may be transmitted to each of the set of remote devices. Each of the set of remote devices may be configured to perform the testing action based on the test command. As mentioned above, the plurality of remote devices 106 are connected to the local system 104 via the second network connection 110 which may be a Universal Serial Bus (USB) connection or a wireless network connection, e.g. a Wi-Fi-based network.

The test command may therefore be transmitted to each of the set of remote devices over the second network connection 110 after converting the test command into a format compatible with the communication protocol applicable to the second network connection 110. It should be noted that for execution of the test command, developer mode may have to be activated for each of the plurality of remote devices 106.

At step 412, a feedback may be received from each of the set of remote devices. Further, at step 410, the feedback may be transmitted to the client system 102. In some embodiments, the feedback may include streaming of content displayed on a display screen of each of the set of remote devices. As such, transmitting the feedback to the client system 102 may include the causing to stream on the client system, in real-time, content displayed on a display screen of each of the set of remote devices.

Once the testing of the remote devices 106 is complete, a test report may be generated corresponding to the remote testing of the set of devices. In some embodiments, the test report may be displayed on the client system 102 and may further be made available for downloading at the client system 102. Further, an associated log file for the test reports can also be accessed from a test reports section of the web page.

Figures 5A, 5B:
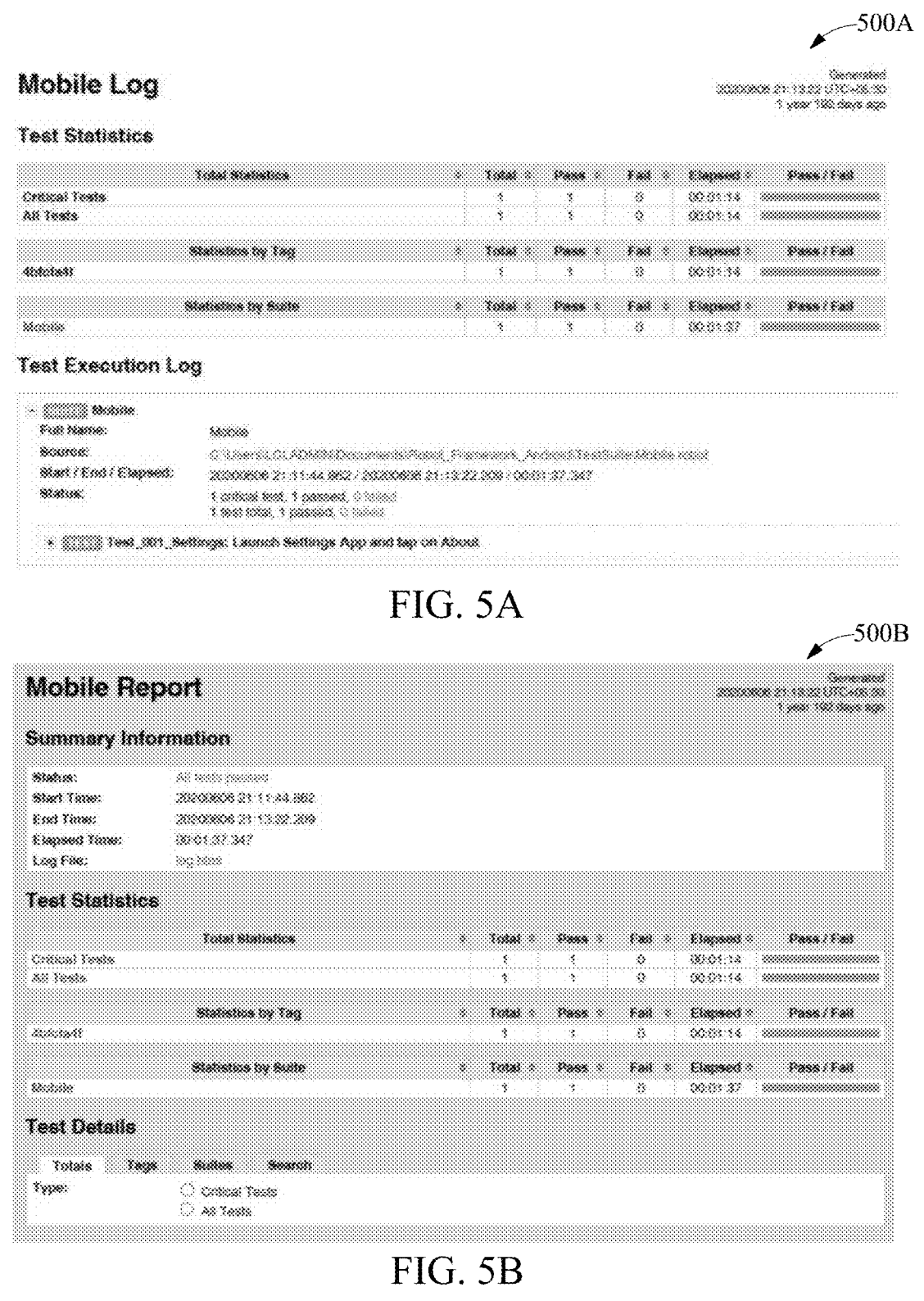

Referring now to FIGS. 5A-5B, snapshots of test reports 500A, 500B are illustrated, in accordance with some embodiments of the present disclosure. as shown in the FIG. 5A, the test report 500A includes a log of all the remote tests (under "All Tests") that have been performed along with the time taken for test execution (under "Elapsed"). Further, the test report 500A includes a log of the particular remote devices (under "statistics by Tag") wherein the test results of that particular remote device are presented along with the identity (i.e. "4bfcfa4f") of the remote device. Alongside, the test report 500A may include a start time, an end time, and an elapsed time (i.e. time taken) for the test execution (under "Start/End/Elapsed"). Further, the test report 500A includes a log of test status, i.e. whether the remote device was successfully tested or not ("passed" or "failed"). Further, the test report 500A may include a suite type (i.e. "Mobile") that was used for the test.

As shown in FIG. 5B, the test report 500B may include similar fields and information of the report 500A, for example, a log of all the remote tests (under "All Tests"), a log of the particular remote devices (under "statistics by Tag"), a start time (under "Start Time"), an end time (under "End Time"), and an elapsed time (under "Elapsed Time"), a log of test status, and a suite type (i.e. "Mobile"). The test reports 500A, 500B can be viewed and downloaded at the client system 102.

One or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

We claim:

1. A method for testing a plurality of remote devices, the method comprising:
   receiving, by a local system, a request from a client system to perform testing on a set of remote devices of a plurality of remote devices, wherein the local system and the client system are connected via a first network connection, wherein
   the local system is configured to obtain and store an identity of each of the plurality of remote devices, and wherein the plurality of remote devices are connected to the local system via a second network connection;
   receiving, by the local system, an input from the client system with reference to a test-suite to perform a testing action on the set of remote devices, wherein the test-suite is uploaded from the client system to the local system;
   generating, by the local system, a test command corresponding to the input to perform the testing action on the set of remote devices;
   transmitting, by the local system, the test command to each of the set of remote devices, wherein each of the set of remote devices is to perform the testing action based on the test command; and
   receiving, by the local system, a feedback from each of the set of remote devices and transmitting the feedback as a live stream of display screens of the set of remote devices to the client system while performing the testing action.

2. The method of claim 1, wherein the first network connection is an Internet-based connection.

3. The method of claim 1, further comprising:
establishing a tunnel connection between the client system and the local system via the first network connection.

4. The method of claim 3, wherein establishing the tunnel connection comprises:
generating a Uniform Resource Locator (URL) corresponding to the local system; and
sharing the generated URL with the client system, wherein the client system is configured to access the local system via a browser installed on the client system using the URL.

5. The method of claim 1, wherein the second connection is one of:
a Universal Serial Bus (USB) connection; and
a wireless network connection.

6. The method of claim 5, wherein the wireless network is a Wi-Fi-based network.

7. The method of claim 1, further comprising:
receiving, from the client system, a selection of identities of the set of remote devices from the plurality of remote devices for performing testing on the set of remote devices.

8. The method of claim 1, wherein the client system is configured to:
upon completion of the remote testing, generate a test report corresponding to the remote testing of the set of devices, wherein the test report is configured to be downloaded at client system.

9. A system for testing a plurality of remote devices, the system comprising:
a processor; and
a memory coupled to the processor, wherein the memory is configured to store a plurality of processor-executable instructions which, upon execution by the processor, cause the processor to:
receive a request from a client system to perform testing on a set of remote devices of a plurality of remote devices, wherein the system and the client system are connected via a first network connection, wherein the system is configured to obtain and store an identity of each of the plurality of remote devices, and wherein the plurality of remote devices are connected to the system via a second network connection;
receive an input from the client system with reference to a test-suite to perform a testing action on the set of remote devices, wherein the test-suite is uploaded from the client system to the system;
generate a test command corresponding to the input to perform the testing action on the set of remote devices;
transmit the test command to each of the set of remote devices, wherein each of the set of remote devices is to perform the testing action based on the test command; and
receive a feedback from each of the set of remote devices and transmitting the feedback as a live stream of display screens of the set of remote devices to the client system while performing the testing action.

10. The system of claim 9, wherein the first network connection is an Internet-based connection.

11. The system of claim 9, wherein the plurality of processor-executable instructions further cause the processor to:
establish a tunnel connection between the client system and the system via the first network connection, wherein establishing the tunnel connection comprises:
generating a Uniform Resource Locator (URL) corresponding to the system; and
sharing the generated URL with the client system, wherein the client system is configured to access the system via a browser installed on the client system using the URL.

12. The system of claim 9, wherein the second connection is one of:
a Universal Serial Bus (USB) connection; and
a wireless network connection.

13. The system of claim 9, wherein the plurality of processor-executable instructions further cause the processor to:
receive, from the client system, a selection of identities of the set of remote devices from the plurality of remote devices for performing testing on the set of remote devices.

14. A non-transitory computer-readable medium storing computer-executable instructions for testing a plurality of remote devices, the computer-executable instructions configured for:
receive a request from a client system to perform testing on a set of remote devices of the plurality of remote devices, wherein the system and the client system are connected via a first network connection, wherein the system is configured to obtain and store an identity of each of the plurality of remote devices, and wherein the plurality of remote devices are connected to the system via a second network connection;
receive an input from the client system with reference to a test-suite to perform a testing action on the set of remote devices, wherein the test-suite is uploaded from the client system to the system;
generate a test command corresponding to the input to perform the testing action on the set of remote devices;
transmit the test command to each of the set of remote devices, wherein each of the set of remote devices is to perform the testing action based on the test command; and
receive a feedback from each of the set of remote devices and transmitting the feedback as a live stream of display screens of the set of remote devices to the client system while performing the testing action.

15. The non-transitory computer-readable medium of claim 14,
wherein the first network connection is an Internet-based connection, and
wherein the second connection is one of:
a Universal Serial Bus (USB) connection; and
a wireless network connection.

16. The non-transitory computer-readable medium of claim 14, wherein the plurality of processor-executable instructions further cause the processor to:
establish a tunnel connection between the client system and the system via the first network connection, wherein establishing the tunnel connection comprises:
generating a Uniform Resource Locator (URL) corresponding to the system; and sharing the generated URL with the client system, wherein the client system is configured to access the system via a browser installed on the client system using the URL.

17. The non-transitory computer-readable medium of claim 14, wherein the computer-executable instructions further configured for:
receive, from the client system, a selection of identities of the set of remote devices from the plurality of remote devices for performing testing on the set of remote devices.

\* \* \* \* \*